United States Patent
Klitsch et al.

(10) Patent No.: US 6,962,330 B2
(45) Date of Patent: Nov. 8, 2005

(54) VIBRATION DAMPER

(75) Inventors: Bernd Klitsch, Nümbrecht (DE); Stefan Brehm, Hennef (DE); Michael Müller, Hennef (DE)

(73) Assignee: ZF Sachs AG, Eitorf (DE)

( * ) Notice: Subject to any disclaimer, the term of this patent is extended or adjusted under 35 U.S.C. 154(b) by 0 days.

(21) Appl. No.: 10/668,578

(22) Filed: Sep. 23, 2003

(65) Prior Publication Data

US 2004/0060788 A1 Apr. 1, 2004

(30) Foreign Application Priority Data

Sep. 26, 2002 (DE) ................. 102 44 858

(51) Int. Cl.$^7$ ............. F16F 9/084; F16F 9/02; B60G 15/12
(52) U.S. Cl. ............. 267/122; 267/64.24; 267/64.27
(58) Field of Search .......... 267/64.11–64.28, 267/122; 188/322.19, 269; 92/98 D

(56) References Cited

U.S. PATENT DOCUMENTS

| | | | |
|---|---|---|---|
| 3,157,396 A | * | 11/1964 | Long, Jr. ............ 267/64.24 |
| 6,116,584 A | * | 9/2000 | Romer ............ 267/64.24 |
| 6,286,820 B1 | * | 9/2001 | Raulf et al. ............ 267/64.21 |
| 2003/0160367 A1 | * | 8/2003 | Klitsch et al. ............ 267/64.23 |
| 2004/0060788 A1 | * | 4/2004 | Klitsch et al. ............ 188/322.16 |

FOREIGN PATENT DOCUMENTS

| | | | |
|---|---|---|---|
| DE | 019645228 A1 | * | 5/1998 |
| DE | 19813901 | * | 10/1999 |
| DE | 10336147 A1 | * | 4/2004 |
| EP | 001403550 A1 | * | 3/2004 |

OTHER PUBLICATIONS

STIC provided tranlsation of DE 19,645,228 A1.*
STIC provided translation for DE19,813,901.*

* cited by examiner

Primary Examiner—Douglas C. Butler
(74) Attorney, Agent, or Firm—Cohen, Pontani, Lieberman & Pavane

(57) ABSTRACT

A vibration damper includes a damping element and a pneumatic spring, where the damping element has a container tube, a fastening part, and a piston rod, and where the pneumatic spring consists of a spring bellows acting as a roll bellows, an outer tube connected to the mass whose vibrations are to be minimized, and a roll-over tube carrying a roll-over profile. The spring bellows forms one boundary of an elastic space filled with a pressurized gas, whereas the roll-over tube seals off the gas space from the container tube and is attached thereto. A stamped and formed support ring, which supports the roll-over tube on the container tube and serves to suppress tilting movements, is installed between the container tube and the roll-over tube.

8 Claims, 2 Drawing Sheets

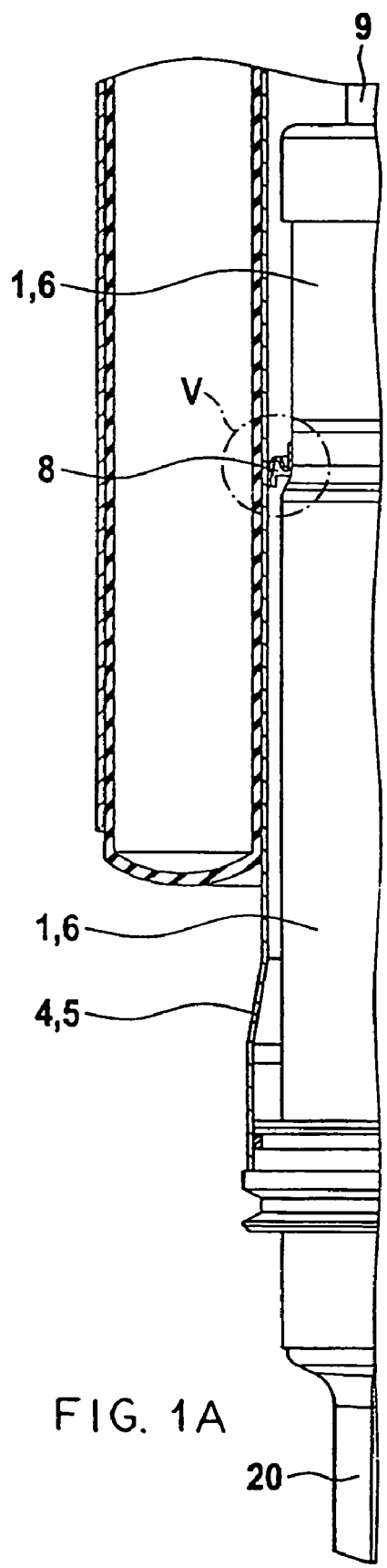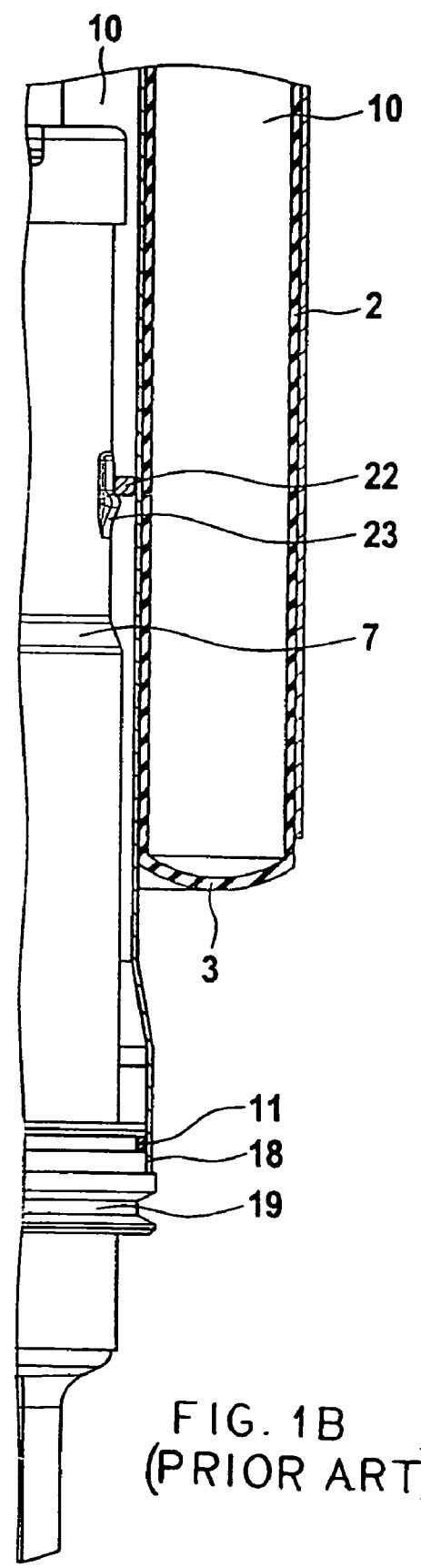
FIG. 1A
FIG. 1B (PRIOR ART)

VIBRATION DAMPER

BACKGROUND OF THE INVENTION

1. Field of the Invention

The invention pertains to a vibration damper, consisting of a damping element and a pneumatic spring, where the damping element has a container tube, a fastening part, and a piston rod, and where the pneumatic spring consists of a spring bellows acting as a roll bellows, an outside tube connected to the mass whose vibrations are to be minimized, and a roll-over tube carrying a roll-over profile. The spring bellows forms one boundary of a spring space filled with a pressurized gas, whereas the roll-over tube seals off the gas space from the container tube and is fastened thereto.

2. Description of the Related Art

Vibration dampers of the type indicated above are used, for example, on the suspension of a truck chassis to isolate the body of the vehicle as much as possible from the vibrations passed in the chassis from the street via the wheel suspensions. The outer tube of the pneumatic spring and the piston rod of the damping element are connected to the vehicle body and to the chassis, respectively, where the action of the pneumatic spring depends on the size of the gas space, on the pressure prevailing in the gas space, on the distance between the outer tube and the roll-over tube, and on the shape of the roll-over profile on the roll-over tube. Whereas the problem of how to seal off the gas space from the atmosphere is solved by the use of an O-ring between the roll-over tube of the pneumatic spring and the container tube of the damping element, the design which has been used so far includes a support ring, which is produced by a cutting operation. Such a ring can be produced only with considerable effort in terms of the fabrication technology involved, and it must then be connected to the container tube. A contour of the roll-over tube can now be supported and/or centered on the support ring. The larger the number of units in the series, however, the greater the need for economizing and for a more reliable way to deal with the above-mentioned support point for the roll-over tube on the container tube.

SUMMARY OF THE INVENTION

In order to economically manufacture the support point of the roll-over tube on the container tube of a damping element, the present invention proposes a support ring which is stamped and formed from sheet steel, and which has a profile which corresponds approximately to the shape of an "S" in cross section. The ring also has a collar on its inside diameter with a contact surface, by which the support ring can be pressed onto the container tube. At the point where the support ring is to be positioned, the container tube has a taper, on the bevel of which the collar comes to rest when the support ring is pushed over the narrower end of the container tube. The rollover profile of the roll-over tube has a section of reduced diameter in the area where the support ring is located; the contour of this area of reduced diameter is approximately parallel to that of the container tube and has a cylindrical section which is parallel to the narrower part of the container tube so that it can support the support ring.

On the outer area of its profile, the support ring has radially resilient spring tongues and openings; when the roll-over tube is installed on the container tube, the tongues tightly under compression against the cylindrical area with the reduced diameter and work together with a fastening point on a retaining ring to fasten the roll-over tube to the container tube. The roll-over tube is thus prevented from tipping during the operation of the vibration damper, which is important because such tipping could lead to leaks at the O-ring present at the fastening point.

Starting from the gas content of a gas space, which is formed by an outer tube solidly attached to the mass, a spring bellows, and the roll-over tube, which acts as a pneumatic spring and is thus under continuous pressure, compressed air is forced past the support ring on the damping element as the piston rod moves back and forth and as the spring bellows rolls over the roll-over tube. For this reason, openings are provided around the ring, openings which are large enough to keep the velocity of the air and the noise which is produced within tolerable limits.

The present invention therefore achieves the object of providing a vibration damper having a damping element and a pneumatic spring with a roll-over tube as a component of the pneumatic spring, where the roll-over tube can be supported with respect to a container tube of the damping element in a cost-favorable and reliable manner without the need for a great deal of assembly work.

An exemplary embodiment of a support for the roll-over tube of a pneumatic spring with respect to the container tube of a damping element is explained below on the basis of several drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1A shows a vibration damper in which support for a roll-over tube on a container tube is provided by a support ring according to the invention;

FIG. 1B shows a vibration damper in which support for a roll-over tube on a container tube is provided by a support ring according to the prior art;

DETAILED DESCRIPTION OF THE PRESENTLY PREFERRED EMBODIMENTS

Figure 2:
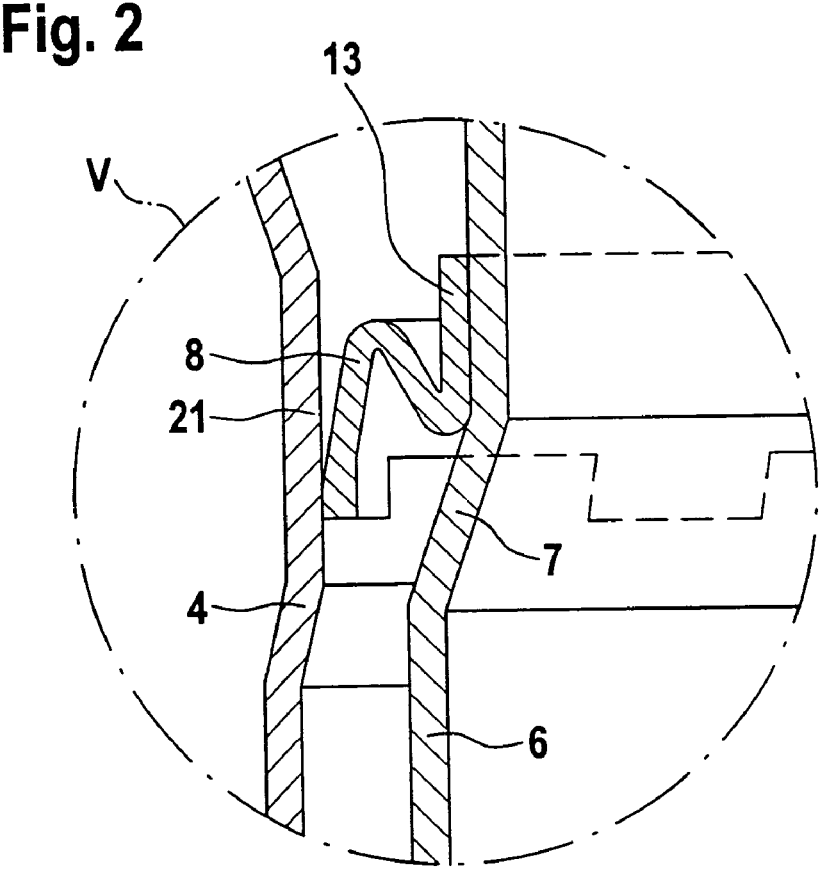
FIG. 2 shows an enlarged view of the support ring located between the container tube and the roll-over tube.

FIG. 1A shows a vibration damper consisting of a damping element 1 and a pneumatic spring, where the damping element 1 has a container tube 6, a fastening part 20, and a piston rod 9. The pneumatic spring consists of a spring bellows 3, acting as a roll bellows; a gas space 10 under the pretension of a pressurized gas; an outer tube 2, which is connected to the mass whose vibrations are to be minimized; and a roll-over tube 4, which carries a roll-over profile 5. The spring bellows 3, acting as an elastic element, connects the outer tube 2 to the roll-over tube 4; when the outer tube 2 moves axially relative to the roll-over tube 4, the spring bellows 3 rolls up and down over the roll-over profile 5 of the roll-over tube 4, and as a result of the compression of the gas, it performs the function of a spring. In the present exemplary embodiment, the rollover tube 4 encloses the container tube 6 and is sealed off at the end near the fastening part 20 against the container tube 6 by means of an O-ring 11 on a retaining ring 19 at an attachment point 18, so that the gas space 10 surrounds the container tube 6. The roll-over tube 4 is also supported by a support ring 8 against a narrower part of the container tube 6, the support ring 8 resting against the beveled surface of a taper 7 on the container tube 6 and thus positioned at a section of reduced diameter 21 on the roll-over tube 4.

FIG. 1B shows a stamped area 23, representing the state of the art, on which a ring 22 rests to guide the roll-over tube 4.

From the enlarged view of area V in FIG. 2, it can be seen how the support ring 8 is positioned between the section of reduced diameter 21 and the narrower part of the container tube 6 at the beveled surface of the taper 7, where a collar 13 on the support ring 8 is seated preferably with a press-fit on the container tube 6.

Figure 3:
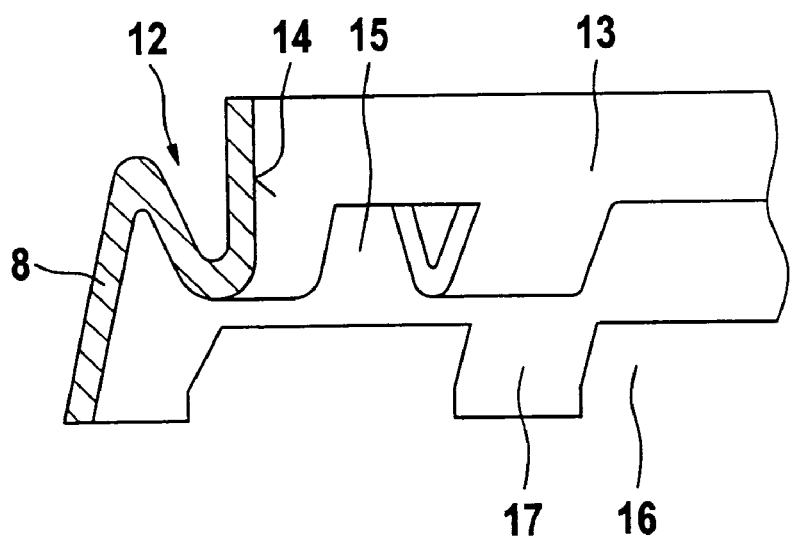
FIG. 3 shows a partial cross section of the support ring with a profile, a collar, tongues, and openings.

FIG. 3 shows a contact surface 14 on the inside diameter of the collar 13, which is in contact with the container tube 6. In addition, the support ring 8 has a cross-sectional profile 12 in the form of an S, at the other end of which openings 16 are provided on the circumference of the support ring 8, which have the effect of creating radially resilient spring tongues 17 in the areas between them, these tongues bearing under compression against the inside diameter of the section of reduced diameter 21 of the roll-over tube 4 after the roll-over tube 4 is installed. In the middle circumferential area of the support ring 8, openings 15 are provided, which are intended to allow the compressed air in the gas space 10 to flow through.

Because the support ring 8 can be produced by stamping and forming, it offers the advantages of low production cost and greater freedom of design. According to the state of the art, it was necessary to stamp the container tube and to connect the support ring to the container tube.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
    a damping element comprising a container tube, a fastening part, and a piston rod;
    a pneumatic spring comprising an outer tube for connecting to a mass whose vibrations are to be damped, a rollover tube fixed to said container tube and sealing off a gas space between said container tube and said rollover tube, and a spring bellows between said outer tube and said rollover tube, said spring bellows bounding a spring space filled with a pressurized gas and communicating with said gas space between said rollover tube and said container tube; and
    a support ring which is stamped and formed from sheet metal installed between the rollover tube and the container tube, said support ring supporting and centering the rollover tube on the container tube, said support ring having radially resilient spring tongues which are mounted against said rollover tube, said supporting comprising:
    an inner circumferential area which is mounted on said container tube,
    an outer circumferential area comprising said spring tongues, and
    a middle area which connects said inner area and said outer area to form an S-shaped profile.

2. A vibration damper as in claim 1 wherein said support ring comprises a collar by which it is mounted on the container tube.

3. A vibration damper as in claim 1 wherein said container tube is formed with a stop which positions the support ring on the container tube.

4. A vibration damper as in claim 3 wherein said stop comprises a beveled surface on said container tube.

5. A vibration damper as in claim 1 wherein said support ring is positioned on said container tube by one of welding, pleating, adhesive bonding, brazing, and press-fitting.

6. A vibration damper as in claim 1 wherein said outer circumferential area is provided with openings between said spring tongues.

7. A vibration damper as in claim 1 wherein said middle area is provided with openings which permit passage of gas.

8. A vibration damper as in claim 1 wherein said support ring is provided with openings which permit passage of gas.

* * * * *